Figure 1:
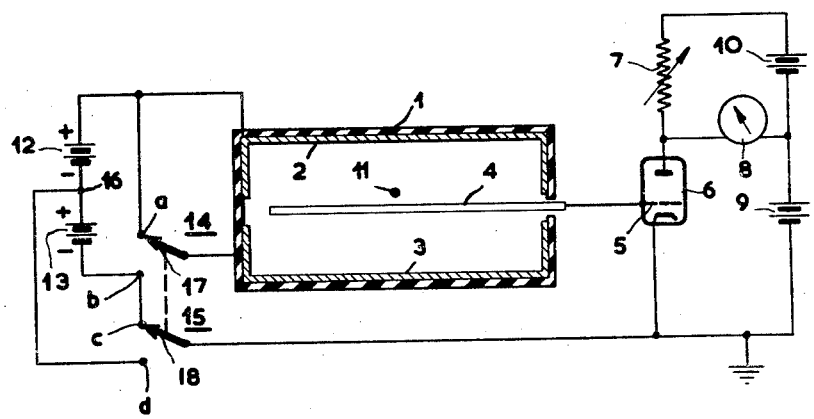

Nov. 7, 1961      S. N. POCOCK      3,008,051

RADIATION METER

Filed May 9, 1958

INVENTOR
SYDNEY NORMAN POCOCK

BY
AGENT

United States Patent Office 3,008,051
Patented Nov. 7, 1961

3,008,051
RADIATION METER
Sydney Norman Pocock, Carshalton Beeches, England, assignor to North American Philips Company, Inc., New York, N.Y.
Filed May 9, 1958, Ser. No. 734,172
Claims priority, application Great Britain May 20, 1957
12 Claims. (Cl. 250—83.6)

This invention relates to radiation meters and more particularly to meters of the ionization chamber type.

Such meters comprise essentially a chamber having walls of conductive material or a continuous conductive coating on their inner surface, which walls or coating act as an anode, and a collector electrode, which may be a wire, plate or grid, disposed within the chamber. In operation a potential difference is set up between the anode and collector electrode and any ionizing radiations present ionize the gas, which is usually air, within the chamber and an electric current flows between the two electrodes. This current is measured by an electric circuit which includes a meter. Due to the fact that the ionization current is extremely small it is usually amplified by a single stage amplifier which includes the meter in its anode circuit.

In a prior arrangement a high-megohm input resistor has been employed in the grid-circuit of the amplifier and the meter display has been linear. This has necessitated in order for the arrangement to measure various ranges of radiation intensities, a switching mechanism either switching in meter-shunt resistors or other input resistors.

The use of such switching mechanisms in radiation measuring instruments has several disadvantages and these have been overcome in a known instrument which employs a logarithmic indication of radiation intensity. In the logarithmic instrument no input resistor is employed and the collector electrode of the ionization chamber is connected solely to the control electrode of a vacuum tube amplifier. By this means the amplifier anode current can be arranged to be in a logarithmic relationship with the ionization current in the chamber and therefore also in such a relationship to the ionizing radiation. However, in the logarithmic intrument is is necessary in order to maintain the grid of the amplifier at some reference level in the absence of any ambient ionizing radiation, to provide a fixed weak source of such radiation within the chamber. Thus the chamber in the absence of ambient radiation passes a small current and by means of an adjustable resistor in the circuit of the amplifier the meter can be set to zero or other fixed reference point prior to employing the instrument to measure the total radiation intensity at a particular place.

However, it often happens that it is extremely inconvenient to remove the instrument to a place where the ambient radiation intensity is zero or substantially zero for the purpose of setting the zero of the meter and it can be seen that unless the instrument is set to zero at such a place the reading of the instrument in a subsequent measurement is always subject to some error.

It is an object of the invention to provide an improved radiation measuring instrument in which the zero or other reference reading of the meter can be set more accurately.

According to the present invention a radiation meter for metering ambient radiation comprises an ionization chamber having a first anode and a second anode and a collector electrode arranged between the anodes to effectively divide the chamber into two equal or substantially equal volumes, means for connecting the first anode to a source of saturation bias potential positive with respect to the collector electrode and switch means for selectively connecting the second anode either to a source of saturation bias potential positive with respect to the collector electrode or to a source of saturation bias potential negative with respect to the collector electrode. The radiation meter further comprises a source of radiation for causing ionization in the chamber in such a manner that more ionization is produced in the region between the collector electrode and the first anode than in the region between the collector electrode and the second anode, said ionization in the latter region being preferably zero, a logarithmic current measuring device comprising a vacuum amplifier tube having at least a control grid, anode and cathode, and current indicating means in the anode circuit of the vacuum tube, and means for connecting the control grid solely to the collector electrode. In a radiation meter according to the invention, the collector electrode effectively divides the chamber into exactly equal volumes when with the second anode connected to a source of negative saturation bias potential, the ambient or external radiation gives rise to equal ion currents in the two halves of the chamber. In this case the collector current due to such radiation will be zero and the actual collector current will be due entirely to the ionization caused by the calibration source. Under such conditions the zero or other reference setting of the current indicating means can be accurately set. By switching the second anode to a source of positive saturation bias potential the meter is then set for normal operation for indicating in a logarithmic manner radiation intensities. As mentioned above by connecting the control electrode of the vacuum tube solely to the collector electrode the current in the anode circuit of the tube can be made to be a logarithmic function of the radiation intensity. This is achieved by operating the control grid-cathode diode of the vacuum tube in the retarding field region.

If, as often occurs in practice, there are certain stray volumes of air, e.g. around the vacuum amplifier tube, which contribute to the total ionization current, the actual volumes of the two halves of the main chamber may be designed slightly unequal so that they are only substantially equal so as to provide perfect cancellation for a uniform external radiation field.

The source of radiation, as described, may alternatively be a stronger source capable of providing calibration at or near full scale at say 10 r./hr. with a shutter of absorbing material such that the effective dose-rate with the shutter closed is, for example, 1 mr./hr. to stabilize the zero setting in the manner described.

Figure 2:
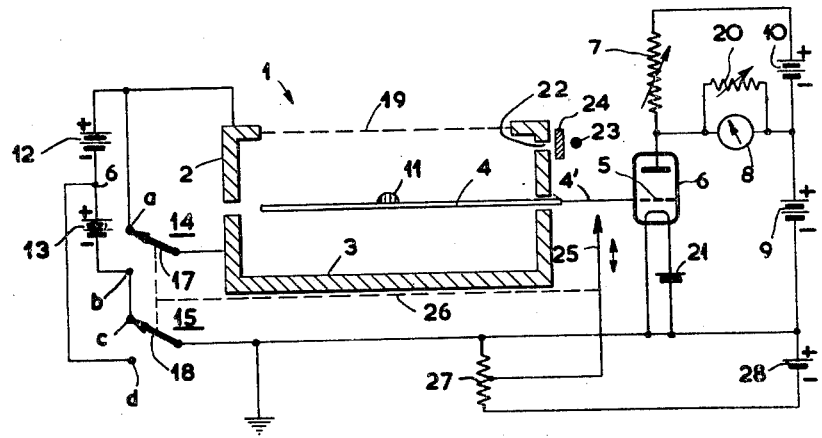

In order that the present invention may be readily carried into effect, it will now be described with reference to the accompanying drawing, wherein:

FIG. 1 is a schematic diagram of an embodiment of the apparatus of the present invention; and FIG. 2 is a modification of the embodiment of FIG. 1.

In FIG. 1, 1 designates an ionization chamber of which a conductive anode coating on its internal surfaces is divided into two symmetrical halves 2 and 3. A collector electrode 4 which is disposed between the anodes 2 and 3 may be of the usual form such as a wire mesh, a metal plate or a plate of insulating material provided with a conductive coating. The walls of the chamber are made thin to render them transparent to X-ray and gamma radiation. The collector electrode is connected solely to the control grid 5 of an electrometer tube 6. Such connection may be made, if desired, via a grid-stopper resistor. The anode circuit of the tube 6 includes an adjustable resistor 7 and a meter 8. The tube voltage is provided by batteries 9 and 10. The tube 6 is operated in such manner that the grid current-anode current characteristic of said tube is logarithmic. Within the ionization chamber is provided a weak source 11 of alpha particles, such as uranium oxide. The anode 2 is connected to the positive terminal of a battery 12 connected in series with a battery 13, both generating a saturation bias potential of, for example, 30 volts. The positive terminal of battery 12 is also connected to contact *a* of a two pole switch 14 of which the other contact *b* is connected to the negative terminal of battery 13. Contact *b* is also connected to contact *c* of switch 15 of which the contact *d* is connected to the junction 16 of the batteries 12 and 13. The wiper arm 17 of switch 14 is connected to the anode 3 and the arm 18 of switch 15 is connected to the cathode of the tube 6 and to ground potential. Switches 14 and 15 are mechanically ganged.

Before employing the chamber to determine the radiation intensity at a particular place the zero of the meter 8 is set in the following manner. The switches 14 and 15 are set with their wiper arms 17 and 18 in contact with the contacts *b* and *d*, respectively. In this manner the chamber 1 is effectively two ionization chambers, anode 2 being 30 volts positive with respect to the collector electrode 4 and anode 3 being 30 volts negative with respect to this electrode. The collector electrode is positioned to effectively divide the chamber 1 into two equal volumes when the ambient or external radiation gives rise to equal ion currents in the two halves. Due to the opposite polarity of the anodes 2 and 3 the resultant collector current is zero. By arranging the source 11 in such manner that it causes zero or a relatively small amount of ionization in the region between the collector 4 and anode 3 there will be a resultant collector current due solely to this source 11 which is amplified by the tube 6 and by adjustment of resistor 7 the zero of the meter 8 can be set. It is thus seen that the setting of the zero is insensitive to the external radiation. If the alpha source 11 is carried by the collector 4 this electrode must be opaque or substantially opaque to alpha-particles. To prepare the instrument for the measurement of external radiation the switches 14 and 15 are set in their other positions and both anodes 2 and 3 are then at the same potential, namely 60 volts with respect to ground potential. If any ambient radiation exists the meter will indicate the intensity of such radiation.

The collector electrode 4 need not extend completely across the chamber to effectively divide it into two halves. If the electrode 4 is in the form of a metal sheet or a conductive coating on an insulating support, almost any position of the source 11 will be satisfactory in that it can under these conditions give rise to little, if any, ionization in the lower half of chamber 1, alpha particles being of very short range. When the collector is in the form of a wire or wire mesh, if the source 11 is to give rise to zero or relatively little ionization in the lower half of the chamber, the source can be situated remote from the lower half of the chamber. Alternatively, the source can be positioned near the collector but with a shield or deflector arranged between the source and the collector. The source 11 will usually be in the form of a layer on the electrode 4.

In the arrangement described, the collector electrode is quite untouched during the switching process and the switching involves only circuits at a low insulation level. There will, of course, be a disturbance when switching occurs and this must be allowed to settle down before the zero can be set, or normal operation re-established after the zero setting.

If desired, a single source of potential may be employed to provide the voltage for the chamber 1 and the tube 6. It is not necessary for the batteries 12 and 13 to be of the same potential provided they are at least of the saturation bias potential for the chamber halves. At saturation bias potential, increase in bias potential does not cause any increase or significant increase in collector current.

In the arrangement above described there is provided (but not shown) within or just outside the ionization chamber apart from the zero-setting source 11, another stronger source of radiation for calibration purposes as is sometimes used in ionization chamber measuring instruments, the radiation from the latter source being normally shut off by a shutter arrangement. However, it is possible to employ a single strong source of radiation for effecting both zero-setting and calibration by employing a shutter of absorbing material, such as aluminium, which restricts the ionizing effect of the calibration source to the weak level required for zero setting.

In a modified form of the above-described radiation meter, since certain stray volumes of air, for example around the electrometer tube 6, contribute to the total ionization current the actual volumes of the two halves of the chamber may be designed slightly unequal so as to provide perfect cancellation for a uniform external radiation field.

In FIG. 2, the collector electrode 4 consists of a metal sheet which carries a weak source 11 of alpha radiation, such as uranium oxide. The collector 4 is transparent to gamma or X-ray radiation but opaque to alpha radiations. From the collector electrode 4 extends a collector lead 4' which is connected solely to the control grid 5 of electrometer amplifier tube 6. The connection may be made, if desired, via a grid-stopper resistor. The anode circuit of tube 6 includes an adjustable resistor 7. The voltage supply for the tube 6 is provided by batteries 9 and 10. Between the anode of tube 6 and the junction of batteries 9 and 10 is connected the meter 8 which has a variable shunt resistor 20 connected across it. Cathode heater current of tube 6 is provided by a battery 21.

The chamber has a window 22 adjacent to which is arranged a strong alpha source 23 of radium and a shutter 24 which can be moved to allow or prevent radiation from source 23 passing through window 22 into the chamber 1.

With the arrangement shown in FIG. 1 it has been mentioned that the disturbance occurring when the chamber halves are switched must be allowed to settle down before the zero is set or normal operation re-established after zero setting. This is due to capacitative effects which cause a charge accumulation on the collector 4, which charge must be allowed to leak away before the meter reading is taken or adjusted. The delay which this effect produces is greatest when the switches 14 and 15 are set to the "zeroing" position and may be several seconds. This delay may be undesirable in practice. The arrangement shown in the accompanying drawing overcomes this disadvantage by including in the circuit another switch element comprising a contact arm 25 mechanically linked to the ganged switches 14 and 15 as indicated by the broken line 26. Arm 25 is connected to the adjustable resistor 27 across which a negative voltage is developed by battery 28. The function of these additional circuit elements is to maintain the potential of the control grid 5 of tube 6 at the same negative value when the chamber halves are switched. The linkage 26 operates such that as the ganged wipers 17 and 18 are switched, but before they are disconnected from the contacts *a* and *c*, arm 25 makes contact with the collector lead 4'; after the wiper arms 17 and 18 reach their other position, in contact with the contacts *b* and *d*, arm 25 is disconnected from lead 4'. In this manner, the charge that is produced on the collector 4 due to the capacitative effect when the chamber halves are switched rapidly leaks away via resistor 27. The resistor 27 is initially set up in such manner that the potential of arm 25 corresponds to that of the grid when the meter is set to zero. The arm 25 similarly clamps the grid at one fixed bias potential when the wiper arms 17 and 18 of switches 14 and 15 are switched from contacts *b* and *d* into the positions shown in the drawing. Thus when the switches 14 and 15 are set to the "zeroing" position the meter can be zeroed immediately and when switched to the "read" position the meter reading soon rises to record the dose-rate of the ambient radiation. No insulation difficulties arise in the use of contact arm 25 because this arm makes direct contact with the wire connecting the collector to the grid, e.g. there is no additional insulator necessary to cause leakage to ground.

To calibrate the meter 8, the switches 14 and 15 are preferably in the "read" position as shown. The shutter 24 is then moved to allow radiation from source 23 into the chamber 1 via auxiliary window 22. Knowing the equivalent dose-rate of source 23, the resistor 20 is adjusted to set the meter to that value. Thus if the equivalent dose-rate of source 23 is 100 mr./hr., that is, if the source causes the same amount of ionization in the chamber as an ambient radiation of 100 mr./hr., the resistor is then adjusted until the meter indicates a dose-rate of 100 mr./hr., which may in practice be arranged to correspond to a two-thirds scale deflection.

Typical values for the various circuit elements are given in the following table.

*Table of components*

| | |
|---|---|
| Resistor 7 | 50K log. ohms. |
| Resistor 20 | 50K log. ohms. |
| Resistor 27 | 1 megohm. |
| Battery 9 | 6.5 volts. |
| Battery 10 | 4 volts. |
| Battery 12 | 30 volts. |
| Battery 13 | 30 volts. |
| Battery 21 | 1.3 volts. |
| Battery 28 | 2.7 volts. |
| Valve 6 | Mullard ME 1404. |
| Meter 8 | 50 microamperes full scale deflection. |
| Equivalent dose-rate source 11 | 1 mr./hr. |
| Equivalent dose-rate source 23 | 100 mr./hr. |

What is claimed is:

1. Radiation indicating apparatus comprising an ionization chamber having a first anode, a second anode and a collector electrode positioned between said first and second anodes in a manner whereby said chamber is divided into two substantially equal volumes, a source of radiation for causing ionization in said chamber in a manner whereby relatively more ionization is produced in the region between said first anode and said collector electrode than in the region between said second anode and said collector electrode, means for applying a saturation bias potential to said first anode positive with respect to said collector electrode and a saturation bias potential to said second anode negative with respect to said collector electrode thereby permitting a zero set of said chamber and for applying a saturation bias potential to said first and second anodes positive with respect to said collector electrode thereby permitting measurement of radiation intensity, the potential of each of said sources being at least equal to the saturation bias potential of said volumes, means for amplifying the current in said collector electrode, and means for indicating the magnitude of the output current of said amplifying means.

2. Radiation indicating apparatus comprising an ionization chamber having a first anode, a second anode and a collector electrode positioned between said first and second anodes in a manner whereby said chamber is divided into two substantially equal volumes, a source of radiation for causing ionization in said chamber in a manner whereby relatively more ionization is produced in the region between said first anode and said collector electrode than in the region between said second anode and said collector electrode, means for applying a saturation bias potential to said first anode positive with respect to said collector electrode and a saturation bias potential to said second anode negative with respect to said collector electrode thereby permitting a zero set of said chamber and for applying a saturation bias potential to said first and second anodes positive with respect to said collector electrode thereby permitting measurement of radiation intensity, the potential of each of said sources being at least equal to the saturation bias potential of said volumes, an electron discharge device having an anode, a cathode and a control grid, means connecting said collector electrode to said control grid, and current indicating means connected to said anode.

3. Radiation indicating apparatus comprising an ionization chamber having a first anode, a second anode and a collector electrode positioned between said first and second anodes in a manner whereby said chamber is divided into two substantially equal volumes, a source of radiation for causing ionization in said chamber in a manner whereby relatively more ionization is produced in the region between said first anode and said collector electrode than in the region between said second anode and said collector electrode, means for applying a saturation bias potential to said first anode positive with respect to said collector electrode and a saturation bias potential to said second anode negative with respect to said collector electrode thereby permitting a zero set of said chamber and for applying a saturation bias potential to said first and second anodes positive with respect to said collector electrode thereby permitting measurement of radiation intensity, the potential of each of said sources being at least equal to the saturation bias potential of said volumes, means for amplifying the current in said collector electrode, means for indicating the magnitude of the output current of said amplifying means, and means for varying the magnitude of the output current of said amplifying means.

4. Radiation indicating apparatus comprising an ionization chamber having a first anode, a second anode and a collector electrode positioned between said first and second anodes in a manner whereby said chamber is divided into two substantially equal volumes, a source of radiation for causing ionization in said chamber in a manner whereby relatively more ionization is produced in the region between said first anode and said collector electrode than in the region between said second anode and said collector electrode, means for applying a saturation bias potential to said first anode positive with respect to said collector electrode and a saturation bias potential to said second anode negative with respect to said collector electrode thereby permitting a zero set of said chamber and for applying a saturation bias potential to said first and second anodes with respect to said collector electrode thereby permitting measurement of radiation intensity, the potential of each of said sources being at least equal to the saturation bias potential of said volumes, an electron discharge device having an anode, a cathode and a control grid, means connecting said collector electrode to said control grid, current indicating means connected to said anode and a variable resistor connected to said anode for varying the magnitude of the output current of said discharge device.

5. Radiation indicating apparatus comprising an ionization chamber having a first anode, a second anode and a collector electrode positioned between said first and second anodes in a manner whereby said chamber is divided into two substantially equal volumes, a source of radiation for causing ionization in said chamber in a manner whereby relatively more ionization is produced in the region between said first anode and said collector electrode than in the region between said second anode and said collector electrode, a source of saturation bias potential having a positive voltage terminal and a negative voltage terminal, means connecting said positive voltage terminal to said first anode, switching means connecting said second anode to said positive voltage terminal in one position and to said negative voltage terminal in another position, means for amplifying the current in said collector electrode, means for indicating the magnitude of the output current of said amplifying means, and means for varying the magnitude of the output current of said amplifying means.

6. Radiation indicating apparatus comprising an ionization chamber having a first anode, a second anode and a collector electrode positioned between said first and second anodes in a manner whereby said chamber is divided into two substantially equal volumes, a source of radiation for causing ionization in said chamber in a manner whereby relatively more ionization is produced in the region between said first and said collector electrode than in the region between said second anode and said collector electrode, a source of saturation bias potential having a positive voltage terminal and a negative voltage terminal, means connecting said positive voltage terminal to said first anode, switching means connecting said second anode to said positive voltage terminal in one position and to said negative voltage terminal in another position, an electron discharge device having an anode, a cathode and a control grid, means connecting said collector electrode to said control grid, current indicating means connected to said anode, and a variable resistor connected to said anode for varying the magnitude of the output current of said discharge device.

7. Radiation indicating apparatus comprising an ionization chamber having a first anode, a second anode and a collector electrode positioned between said first and second anodes in a manner whereby said chamber is divided into two substantially equal volumes, a source of radiation for causing ionization in said chamber in a manner whereby relatively more ionization is produced in the region between said first anode and said collector electrode than in the region between said second anode and said collector electrode, a first source of saturation bias potential having a positive terminal and a negative terminal, a second source of saturation bias potential having a positive terminal and a negative terminal connected in series aiding arrangement with said first source, switching means comprising a first connecting arm connected to said second anode and adapted to contact one of first and second contacts and a second connecting arm connected to a point at ground potential adapted to contact one of third and fourth contacts, means coupling said connecting arms in a manner whereby in one position said first arm contacts said first contact when said second arm contacts said third contact and in another position said first arm contacts said second contact when said second arm contacts said fourth contact, means connecting the positive terminal of said series arrangement to said first anode, means connecting said first terminal to said positive terminal of said series arrangement, means connecting said second and third terminals to the negative terminal of said series arrangement, means connecting said fourth terminal to a point in said series arrangement intermediate said first and second sources, means for amplifying the current in said collector electrode, means for indicating the magnitude of the output current of said amplifying means, and means for varying the magnitude of the output current of said amplifying means.

8. Radiation indicating apparatus comprising an ionization chamber having a first anode, a second anode and a collector electrode positioned between said first and second anodes in a manner whereby said chamber is divided into two substantially equal volumes, a source of radiation for causing ionization in said chamber in a manner whereby relatively more ionization is produced in the region between said first anode and said collector electrode than in the region between said second anode and said collector electrode, means for applying a saturation bias potential to said first anode positive with respect to said collector electrode and a saturation bias potential to said second anode negative with respect to said collector electrode thereby permitting a zero set of said chamber and for applying a saturation bias potential to said first and second anodes positive with respect to said collector electrode thereby permitting measurement of radiation intensity, the potential of each of said sources being at least equal to the saturation bias potential of said volumes, an electron discharge device having an anode, a cathode and a control grid, means connecting said collector electrode to said control grid, current indicating means connected to the anode of said discharge device, and means for main-taining said control grid at substantially the same negative potential upon switching of said chamber from one operating condition to the other.

9. Radiation indicating apparatus comprising an ionization chamber having a first anode, a second anode and a collector electrode positioned between said first and second anodes in a manner whereby said chamber is divided into two substantially equal volumes, a source of radiation for causing ionization in said chamber in a manner whereby relatively more ionization is produced in the region between said first anode and said collector electrode than in the region between said second anode and said collector electrode, a first source of saturation bias potential having a positive terminal and a negative terminal, a second source of saturation bias potential having a positive terminal and a negative terminal connected in series aiding arrangement with said first source, switching means comprising a first connecting arm connected to said second anode and adapted to contact one of first and second contacts and a second connecting arm connected to a point at ground potential adapted to contact one of third and fourth contacts, means coupling said connecting arms in a manner whereby in one position said first arm contacts said first contact when said second arm contacts said third contact and in another position said first arm contacts said second contact when said second arm contacts said fourth contact, means connecting the positive terminal of said series arrangement to said first anode, means connecting said first terminal to said positive terminal of said series arrangement, means connecting said second and third terminals to the negative terminal of said series arrangement, means connecting said fourth terminal to a point in said series arrangement intermediate said first and second sources, an electron discharge device having an anode, a cathode and a control grid, means connecting said collector electrode to said control grid, current indicating means connected to the anode of said discharge device, and means for maintaining said control grid at substantially the same negative potential upon switching of said switching means from one position to the other.

10. Radiation indicating apparatus comprising an ionization chamber having a first anode, a second anode and a collector electrode positioned between said first and second anodes in a manner whereby said chamber is divided into two substantially equal volumes, a source of radiation for causing ionization in said chamber in a manner whereby relatively more ionization is produced in the region between said first anode and said collector electrode than in the region between said second anode and said collector electrode, a first source of saturation bias potential having a positive terminal and a negative terminal, a second source of saturation bias potential having a positive terminal and a negative terminal connected in series aiding arrangement with said first source, switching means comprising a first connecting arm connected to said second anode and adapted to contact one of first and second contacts and a second connecting arm connected to a point at ground potential adapted to contact one of third and fourth contacts, means coupling said connecting arms in a manner whereby in one position said first arm contacts said first contact when said second arm contacts said third contact and in another position said first arm contacts said second contact when said second arm contacts said fourth contact, means connecting the positive terminal of said series arrangement to said first anode, means connecting said first terminal to said terminal to said positive terminal of said series arrangement, means connecting said second and third terminals to the negative terminal of said series arrangement, means connecting said fourth terminal to a point in said series arrangement intermediate said first and second sources, an electron discharge device having an anode, a cathode and a control grid, means connecting said collector electrode to said control grid, current indicating means connected to the anode of said discharge device, and means coupled to said connecting arms for maintaining said control grid at substantially the same negative potential upon switching of said switching means from one position to the other.

11. Radiation indicating apparatus comprising an ionization chamber having a first anode, a second anode and a collector electrode positioned between said first and second anodes in a manner whereby said chamber is divided into two substantially equal volumes, a window in said chamber positioned in the area bounded by said first anode and said collector electrode, a first source of radiation for causing ionization in said chamber in a manner whereby relatively more ionization is produced in the region between said first anode and said collector electrode than in the region between said second anode and said collector electrode, a second source of radiation positioned in operative proximity to said window for causing further ionization in said chamber, means for applying a saturation bias potential to said first anode positive with respect to said collector electrode and a saturation bias potential to said second anode negative with respect to said collector electrode thereby permitting a zero set of said chamber and for applying a saturation bias potential to said first and second anodes positive with respect to said collector electrode thereby permitting measurement of radiation intensity, the potential of each of said sources being at least equal to the saturation bias potential of said volumes, means for amplifying the current in said collector electrode, and means for indicating the magnitude of the output current of said amplifying means.

12. Radiation indicating apparatus comprising an ionization chamber having a first anode, a second anode and a collector electrode positioned between said first and second anodes in a manner whereby said chamber is divided into two substantially equal volumes, a window in said chamber positioned in the area bounded by said first anode and said collector electrode, a first source of radiation for causing ionization in said chamber in a manner whereby relatively more ionization is produced in the region between said first anode and said collector electrode than in the region between said second anode and said collector electrode, a second source of radiation positioned in operative proximity to said window for causing further ionization in said chamber, a first source of saturation bias potential having a positive terminal and a negative terminal, a second source of saturation bias potential having a positive terminal and a negative terminal connected in series aiding arrangement with said first source, switching means comprising a first connecting arm connected to said second anode and adapted to contact one of first and second contacts and a second connecting arm connected to a point at ground potential adapted to contact one of third and fourth contacts, means coupling said connecting arms in a manner whereby in one position said first arm contacts said first contact when said second arm contacts said third contact and in another position said first arm contacts said second contact when said second arm contacts said fourth contact, means connecting the positive terminal of said series arrangement to said first anode, means connecting said first terminal to said positive terminal of said series arrangement, means connecting said second and third terminals to the negative terminal of said series arrangement, means connecting said fourth terminal to a point in said series arrangement intermediate said first and second sources, an electron discharge device having an anode, a cathode and a control grid, means connecting said collector electrode to said control grid, current indicating means connected to the anode of said discharge device, and means for maintaining said control grid at substantially the same negative potential upon switching of said switching means from one position to the other.

References Cited in the file of this patent

UNITED STATES PATENTS

| | | |
|---|---|---|
| 2,493,346 | Herzog | Jan. 3, 1950 |
| 2,585,649 | Hanson | Feb. 12, 1952 |
| 2,696,564 | Ohmart | Dec. 7, 1954 |
| 2,700,110 | Shamos | Jan. 18, 1955 |
| 2,756,348 | Schneider | July 24, 1956 |
| 2,811,660 | Lehrer | Oct. 29, 1957 |
| 2,812,443 | Rich | Nov. 5, 1957 |
| 2,818,509 | Johnston | Dec. 31, 1957 |
| 2,839,688 | Anton | June 17, 1958 |